(12) United States Patent
Yu et al.

(10) Patent No.: US 10,782,410 B2
(45) Date of Patent: *Sep. 22, 2020

(54) METHOD AND APPARATUS FOR CONSTRUCTING REFLECTANCE MAP

(71) Applicant: Baidu Online Network Technology (Beijing) Co., Ltd., Beijing (CN)

(72) Inventors: Li Yu, Beijing (CN); Shichun Yi, Beijing (CN); Shiyu Song, Beijing (CN); Fangfang Dong, Beijing (CN); Baoqiang Xu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 310 days.

This patent is subject to a terminal disclaimer.

(21) Appl. No.: 15/800,260

(22) Filed: Nov. 1, 2017

(65) Prior Publication Data

US 2019/0056501 A1 Feb. 21, 2019

(30) Foreign Application Priority Data

Aug. 15, 2017 (CN) .......................... 2017 1 0697013

(51) Int. Cl.
*G01S 17/89* (2020.01)
*G01S 7/48* (2006.01)
(Continued)

(52) U.S. Cl.
CPC .......... *G01S 17/89* (2013.01); *G01S 7/4808* (2013.01); *G01S 17/86* (2020.01); *G01S 17/06* (2013.01); *G09B 29/005* (2013.01)

(58) Field of Classification Search
CPC .... G01S 17/023; G01S 117/89; G01S 7/4808; G06T 2207/10028; G06T 7/70
See application file for complete search history.

(56) References Cited

U.S. PATENT DOCUMENTS 8,996,228 B1 * 3/2015 Ferguson ........... G01C 21/3461
701/28
9,097,800 B1 * 8/2015 Zhu ....................... G01S 13/865
(Continued)

OTHER PUBLICATIONS

Tomas Trafina, Construction of 3D Point Clouds Using LiDAR Technology, May 2016, Czech Technical University in Prague, Chapter 4 (Year: 2016).*

(Continued)

*Primary Examiner* — John E Breene
*Assistant Examiner* — L. Anderson
(74) *Attorney, Agent, or Firm* — Nixon Peabody LLP

(57) ABSTRACT

In a specific implementation of the method a reflectance map is constructed based on a position and an Euler angle, obtained through a global optimization and used for constructing a reflectance map, of a center of a laser radar corresponding to each frame laser point cloud used for constructing the reflectance map collected in each collection region. This implementation implements the level-by-level pose optimization of laser point clouds used for constructing a reflectance map that are collected in each collection region in an excessively large region, to obtain an accurate position and Euler angle, used for constructing the reflectance map, of a laser radar center corresponding to each frame laser point cloud used for constructing the reflectance map.

15 Claims, 4 Drawing Sheets

(51) Int. Cl.
    *G01S 17/86*     (2020.01)
    *G01S 17/06*     (2006.01)
    *G09B 29/00*     (2006.01)

(56) References Cited

U.S. PATENT DOCUMENTS

2018/0188043 A1*   7/2018   Chen .................. G01C 11/30
2019/0056502 A1*   2/2019   Yu ..................... G01S 17/023

OTHER PUBLICATIONS

Horn et al., Calculating the Reflectance Map, Jun. 1979, Applied Optics, vol. 18, No. 11, pp. all pages (Year: 1979).*
Rehder et al., Global Pose Estimation with Limited GPS and Long Range Visual Odometry, 2012, pp. all pages (Year: 2012).*

* cited by examiner

METHOD AND APPARATUS FOR CONSTRUCTING REFLECTANCE MAP

CROSS-REFERENCE TO RELATED APPLICATION

This application is related to and claims the priority from Chinese Application No. 201710697013.2, filed on Aug. 15, 2017, entitled "Method and Apparatus for Constructing Reflectance Map," having Baidu Online Network Technology (Beijing) Co., Ltd. as the applicant, the entire disclosure of which is incorporated herein by reference.

TECHNICAL FIELD

The present application relates to the field of computers, specifically to the field of navigation, and more specifically to a method and apparatus for constructing a reflectance map.

BACKGROUND

A reflectance map may be used for accurately positioning a vehicle. Currently, a commonly used method for constructing a reflectance map of a region is as follows: a position output by a GPS device and an Euler angle output by an inertial navigation device when each frame laser point cloud is collected in the region are directly used as the position and Euler angle of the laser radar center when the each frame laser point cloud is collected, that is, used as the position and Euler angle of the laser radar center corresponding to the each frame laser point cloud. Coordinates, output by the laser radar, in a laser radar coordinate system of laser points in laser point cloud data corresponding to each frame laser point cloud are transformed by using the position output by the GPS device and the Euler angle output by the inertial navigation device when the each frame laser point cloud is collected, to obtain coordinates in a world coordinate system of the laser points in the each frame laser point cloud. Finally, each frame laser point cloud is merged according to the coordinates in the world coordinate system of the laser points in each frame laser point cloud to obtain a merged laser point cloud corresponding to the to-be-constructed reflectance map. The merged laser point cloud is then projected into a grid occupied by the region, and a mean and a variance of reflection strengths of laser points projected into each grid occupied by the region are calculated, to obtain map data of the reflectance map, so as to construct the reflectance map.

However, because the GPS device may be affected by factors such as satellite signal shifting, and the inertial navigation device may be affected by factors such as error accumulation, the position output by the GPS device and the Euler angle output by the inertial navigation device have large errors, and the coordinates, obtained after the transformation, of the laser points in each frame laser point cloud in the world coordinate system will also have large errors, leading to a reduction in the merging precision of the merged laser point cloud corresponding to the to-be-constructed reflectance map, and a reduction in the precision of the reflectance map. In addition, when a reflectance map of an excessively large region is constructed, because massive laser point clouds are merged, the reduction in the merging precision caused by the errors in the coordinates in the world coordinate system accumulates, significantly affecting the constructed reflectance map of the excessively large region.

SUMMARY

The present application provides a method and apparatus for constructing a reflectance map, so as to solve the technical problems mentioned in the Background section.

According to a first aspect, the present application provides a method for constructing a reflectance map, comprising: respectively selecting, from laser point clouds collected in each collection region in a region corresponding to a to-be-constructed reflectance map, laser point clouds used for constructing a reflectance map, and respectively selecting sample frame laser point clouds from the laser point cloud used for constructing the reflectance map collected in the each collection region; respectively selecting a key frame laser point cloud from the sample frame laser point cloud collected in the each collection region, and respectively determining, based on an adjustment amount corresponding to the key frame laser point cloud collected in the each collection region, an optimal key frame laser point cloud collected in the each collection region, the adjustment amount being determined based on an amount of movement between a center position of a laser radar corresponding to the key frame laser point cloud after being merged with a second key frame laser point cloud and a center position of the laser radar corresponding to the key frame laser point cloud; respectively performing a global pose optimization on a laser point cloud other than the key frame laser point cloud in the laser point cloud used for constructing the reflectance map collected in the each collection region, to obtain a position and an Euler angle, used for constructing the reflectance map, of a center of the laser radar corresponding to each frame laser point cloud used for constructing the reflectance map collected in the each collection region; and constructing the reflectance map based on the position and the Euler angle, used for constructing the reflectance map, of the laser radar center corresponding to the each frame laser point cloud used for constructing the reflectance map collected in the each collection region.

According to a second aspect, the present application provides an apparatus for constructing a reflectance map, comprising: a selection unit, configured to respectively select, from laser point clouds collected in each collection region in a region corresponding to a to-be-constructed reflectance map, laser point clouds used for constructing a reflectance map, and respectively select sample frame laser point clouds from the laser point cloud used for constructing the reflectance map collected in the each collection region; a determining unit, configured to respectively select a key frame laser point cloud from the sample frame laser point clouds collected in the each collection region, and respectively determine, based on an adjustment amount corresponding to the key frame laser point cloud collected in the each collection region, an optimal key frame laser point cloud collected in the each collection region, the adjustment amount being determined based on an amount of movement between a center position of a laser radar corresponding to the key frame laser point cloud after being merged with a second key frame laser point cloud and a center position of the laser radar corresponding to the key frame laser point cloud; an optimization unit, configured to respectively perform a global pose optimization on a laser point cloud other than the key frame laser point cloud in the laser point cloud used for constructing the reflectance map collected in the each collection region, to obtain a position and an Euler angle, used for constructing the reflectance map, of a center of the laser radar corresponding to each frame laser point cloud used for constructing the reflectance map collected in the each collection region; and a construction unit, configured to construct the reflectance map based on the position and the Euler angle, used for constructing the reflectance map, of the laser radar center corresponding to the each frame laser point cloud used for constructing the reflectance map collected in the each collection region.

The method and apparatus for constructing a reflectance map that are provided by the present application, by respectively selecting, from laser point clouds collected in each collection region in a region corresponding to a to-be-constructed reflectance map, laser point clouds used for constructing a reflectance map, and respectively selecting sample frame laser point clouds from the laser point cloud used for constructing the reflectance map that is collected in each collection region; respectively selecting a key frame laser point cloud from the sample frame laser point clouds collected in each collection region, and respectively determining, based on an adjustment amount corresponding to the key frame laser point cloud collected in each collection region, an optimal key frame laser point cloud collected in each collection region; respectively performing a global pose optimization on a laser point cloud other than the key frame laser point cloud in the laser point cloud used for constructing the reflectance map that is collected in each collection region, to obtain a position and an Euler angle, used for constructing the reflectance map, of a laser radar center corresponding to each frame laser point cloud used for constructing the reflectance map that is collected in each collection region; and constructing the reflectance map based on the position and the Euler angle, used for constructing the reflectance map, of the laser radar center corresponding to the each frame laser point cloud used for constructing the reflectance map that is collected in each collection region, implements the level-by-level pose optimization of laser point clouds used for constructing a reflectance map that is collected in each collection region in an excessively large region, to obtain an accurate position and Euler angle, used for constructing the reflectance map, of a laser radar center corresponding to each frame laser point cloud used for constructing the reflectance map, so that accurate coordinates of laser points in each frame laser point cloud used for constructing the reflectance map in a world coordinate system may be obtained, thereby improving the precision of laser point cloud merging, and improving the precision of constructing a reflectance map of an excessively large region.

BRIEF DESCRIPTION OF THE DRAWINGS

Other features, purposes and advantages of the present application will become more apparent from a reading of the detailed description of the non-limiting embodiments, said description being given in relation to the accompanying drawings, among which.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
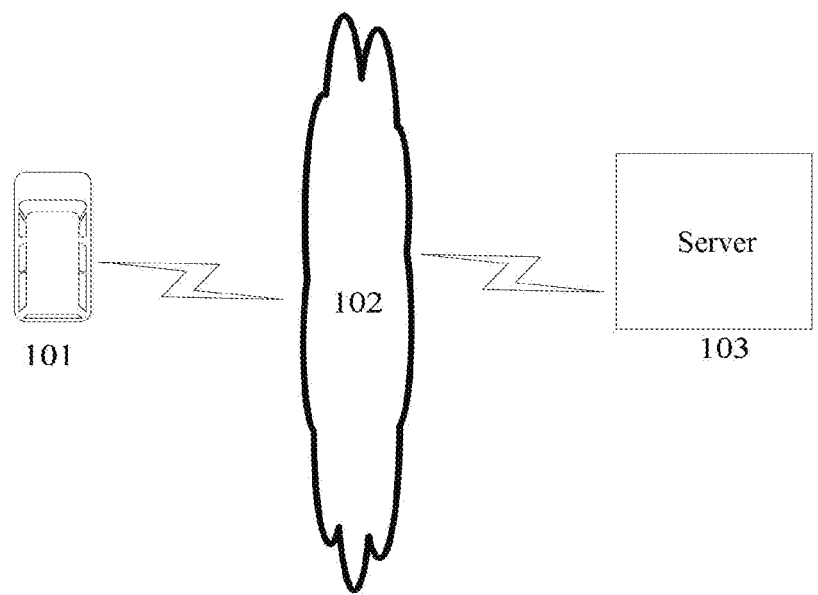
FIG. 1 shows an exemplary system architecture to which a method or apparatus for constructing a reflectance map according to an embodiment of the present application may be applied.

FIG. 1 shows an exemplary system architecture to which a method or apparatus for constructing a reflectance map according to an embodiment of the present application may be applied.

As shown in FIG. 1, the system architecture may include a driverless vehicle 101, a network 102, and a server 103. The network 102 is a medium for providing a communication link between the driverless vehicle 101 and the server 103. The network 102 may use a wireless communication link.

The driverless vehicle 101 may be equipped with a laser radar, a GPS device, and an inertial navigation device. The driverless vehicle 101 may drive in advance for multiple times within a collection region in a region corresponding to a to-be-constructed reflectance map, and use the laser radar to collect laser point clouds. The collected laser point clouds include laser points formed by projecting a laser emitted from the laser radar onto a building object in the region. Each time the laser radar scans a complete circle, a frame laser point cloud may be obtained. The center position of the laser radar of the driverless vehicle 101 when the laser radar collects a laser point cloud may be obtained by using the GPS device. The laser radar may be perpendicularly connected to the GPS device. X-axis and z-axis values of a position indicated by coordinates output by the GPS device when a frame laser point cloud is collected may be used as x-axis and z-axis values of the center position of the laser radar when the frame laser point cloud is collected, and a value obtained by subtracting a differential between the laser radar center and the GPS device in the perpendicular direction from a y-axis value of a position indicated by coordinates output by the GPS device may be used as a y-axis value of the center position of the laser radar. An Euler angle of the laser radar center when a frame laser point cloud is collected may be obtained by using the inertial navigation device. An Euler angle output by the inertial navigation device when a frame laser point cloud is collected may be used as the Euler angle of the laser radar center when the frame laser point cloud is collected. That is, the Euler angle output by the inertial navigation device when a frame laser point cloud is collected may be used as the Euler angle of the laser radar center corresponding to the frame laser point cloud.

The driverless vehicle 101 may send the collected laser point cloud to the server 103. The server 103 may perform a pose optimization on the laser point cloud collected by the driverless vehicle 101 during driving in each collection region in the region corresponding to the to-be-constructed reflectance map, to obtain a position and an Euler angle, used for constructing the reflectance map, of the laser radar center corresponding to each frame laser point cloud used for constructing the reflectance map that is collected in each collection region; transform coordinates, output by the laser radar, in a laser radar coordinate system of laser points in laser point cloud data corresponding to each frame laser point cloud used for constructing the reflectance map, by using the position and the Euler angle, used for constructing the reflectance map, of the laser radar center corresponding to the each frame laser point cloud used for constructing the reflectance map that is collected in each collection region, to obtain coordinates in a world coordinate system of the laser points in the each frame laser point cloud used for constructing the reflectance map that is collected in each collection region; then merge each frame laser point cloud used for constructing the reflectance map that is collected in each collection region, to obtain a merged laser point cloud corresponding to the to-be-constructed reflectance map; and project laser points in the merged laser point cloud corresponding to the to-be-constructed reflectance map into a grid occupied by the region corresponding to the to-be-constructed reflectance map, and calculate a mean and variance of reflection strengths of laser points projected into each grid occupied by the region, to obtain map data of the to-be-constructed reflectance map, so as to construct the reflectance map of the region corresponding to the to-be-constructed reflectance map.

Figure 2:
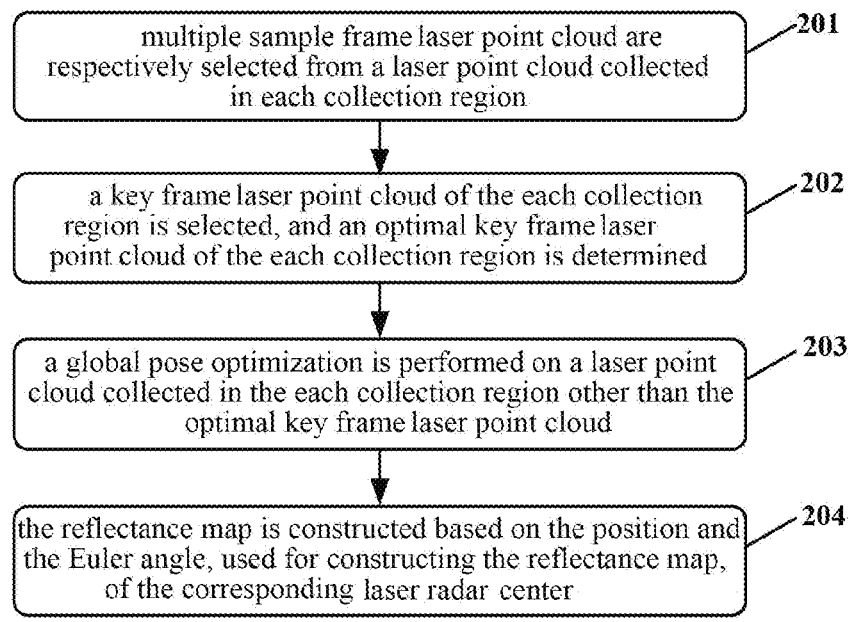
FIG. 2 is a flow chart of a method for constructing a reflectance map according to an embodiment of the present application.

Referring to FIG. 2, a flow of a method for constructing a reflectance map according to an embodiment of the present application is illustrated. The method may be executed by a server, for example, the server 103 in FIG. 1. Correspondingly, an apparatus for constructing a reflectance map may be disposed in the server, for example, the server 103 in FIG. 1. The method includes the following steps:

At step 201, multiple sample frame laser point clouds are respectively selected from laser point clouds collected in each collection region.

In this embodiment, a region corresponding to a to-be-constructed reflectance map may be divided into multiple collection regions in advance. There may be an overlap region between the collection regions.

For example, to construct a reflectance map of a municipality, the region corresponding to the to-be-constructed reflectance map is the geographic area of the municipality. Because the region corresponding to the to-be-constructed reflectance map is an excessively large region, it is impossible to collect all laser point clouds in the region corresponding to the to-be-constructed reflectance map in one go. Therefore, the geographic area of the municipality needs to be divided into multiple collection regions, where there may be an overlap region between the multiple collection regions. The collection of laser point clouds may be divided into multiple phases, and in each phase, a laser point cloud is collected within one collection region.

In this embodiment, to construct a reflectance map of a region, a laser point cloud needs to be collected in each collection region in the region corresponding to the to-be-constructed reflectance map. Then, laser point clouds used for constructing a reflectance map are respectively selected from each collection region. The laser point cloud used for constructing the reflectance map that is collected in each collection region is merged, to obtain a merged laser point cloud corresponding to the to-be-constructed reflectance map. The merged laser point cloud corresponding to the to-be-constructed reflectance map is projected to obtain map data of the reflectance map of the region, the reflectance map of the region may then be constructed.

In this embodiment, the surface of the Earth may be divided in advance in a world coordinate system into a plurality of grids having the same area, and each grid may correspond to a geographic scope of a preset size. The map data of the to-be-constructed reflectance map includes: a mean and a variance of reflection strengths of laser points projected into each of the grids occupied by the region corresponding to the to-be-constructed reflectance map, after the merged laser point cloud corresponding to the to-be-constructed reflectance map is projected.

In this embodiment, the position and the Euler angle of the laser radar center corresponding to a frame laser point cloud may be the position and the Euler angle of the laser radar center that are obtained by using a GPS device and an inertial navigation device when the frame laser point cloud is collected. The Euler angle includes a roll angle, a pitch angle or a yaw angle. The center position of the laser radar is the center position of the laser radar in the world coordinate system.

Because the position and the Euler angle of the laser radar center that are obtained by using the GPS device and the inertial navigation device when each frame laser point cloud used for constructing the reflectance map is collected in each collection region have errors with respect to the actual position and the actual Euler angle of the laser radar center when the each frame laser point cloud used for constructing the reflectance map is collected in the each collection region, a global pose optimization needs to be performed on the laser point cloud used for constructing the reflectance map that is collected in each collection region, to obtain the position and the Euler angle, used for constructing the reflectance map, of the laser radar center corresponding to the each frame laser point cloud used for constructing the reflectance map that is collected in each collection region. Compared with the position and the Euler angle of the laser radar center that are obtained by using the GPS device and the inertial navigation device when each frame laser point cloud used for constructing the reflectance map is collected in each collection region, the position and the Euler angle, used for constructing the reflectance map, of the laser radar center corresponding to the each frame laser point cloud used for constructing the reflectance map that is collected in each collection region are closer to the actual position and the actual Euler angle of the laser radar center when the each frame laser point cloud used for constructing the reflectance map is collected in each collection region.

In this embodiment, laser point clouds collected in each collection region in the region corresponding to the to-be-constructed reflectance map may be acquired first, and a laser point cloud used for constructing the reflectance map is respectively selected from the laser point clouds collected in each collection region. When a laser point cloud used for constructing the reflectance map is selected from laser point clouds collected in a collection region, a laser point cloud corresponding to a center position of the laser radar that has a low confidence level may be removed from the laser point clouds collected in the collection region, and the remaining laser point clouds are used as the laser point clouds used for constructing the reflectance map that is collected in the collection region.

For example, a confidence level of a center position of the laser radar corresponding to a frame laser point cloud may be determined according to a differential between the center position of the laser radar corresponding to the frame laser point cloud and a center position of the laser radar corresponding to a previous frame laser point cloud of the frame laser point cloud. Because the laser radar may quickly scan a frame laser point cloud, there is normally a small differential between the laser radar center corresponding to a frame laser point cloud and the laser radar center corresponding to a previous frame laser point cloud of the frame laser point cloud. When the differential is greater than a threshold, the center position of the laser radar corresponding to the frame laser point cloud has a low confidence level.

In some optional implementations of this embodiment, when a laser point cloud used for constructing the reflectance map is selected from all laser point clouds collected in a collection region, a laser point cloud having a collection time with an erroneous timestamp in all the laser point clouds collected in the collection region may be determined. A center position of the laser radar when a laser point cloud is collected may be obtained by using the GPS device, and a timestamp of a collection time at which the laser point cloud is collected may be a timestamp output by the GPS device. When a timestamp of a collection time of a frame laser point cloud is erroneous, the center position, which is acquired by the GPS device, of the laser radar corresponding to the frame laser point cloud has correspondingly a large error. The laser point clouds collected in the collection region and having a collection time with an erroneous timestamp may be removed. A laser point cloud having an identical center position as the center position of the laser radar in all the laser point clouds collected in the collection region may be determined and removed, so as to remove a redundant frame laser point cloud collected in a case such as stopping at a road junction, thereby reducing the amount of calculation in the subsequent laser point cloud merging process and the interference to the laser point cloud merging process. After the laser point clouds collected in the collection region and having a collection time with an erroneous timestamp and the laser point cloud having an identical center position as the center position of the laser radar are removed, the remaining laser point clouds collected in the collection region may be used as the laser point cloud used for constructing the reflectance map that is collected in the collection region.

In this embodiment, after laser point clouds used for constructing the reflectance map is selected from all laser point clouds collected in a collection region, sample frame laser point clouds may be selected from the laser point clouds used for constructing the reflectance map. Adjacent sample frame laser point clouds are laser point clouds used for constructing the reflectance map, of which the corresponding center positions of the laser radar are adjacent to each other. The sample frame laser point clouds may be respectively selected from the laser point clouds used for constructing the reflectance map that is collected in each collection region, according to distances between the corresponding laser radar centers. For example, the selected sample frame laser point clouds satisfy the following condition: a distance between center positions of the laser radar corresponding to adjacent sample frame laser point clouds is equal to a first preset distance, which is, for example, 0.4 m. In other words, the sample frame laser point clouds may be laser point clouds used for constructing the reflectance map that are spaced from each other by the first preset distance.

At step 202, a key frame laser point cloud of each collection region is selected, and an optimal key frame laser point cloud of each collection region is determined.

In this embodiment, the key frame laser point cloud may be respectively selected from the sample frame laser point clouds collected in each collection region, and an adjustment amount corresponding to the key frame laser point cloud collected in each collection region may be respectively determined.

In this embodiment, the key frame laser point cloud may be respectively selected from the sample frame laser point clouds collected in each collection region according to distances between the corresponding center positions of the laser radar. Adjacent key frame laser point clouds are sample frame laser point clouds, of which the corresponding center positions of the laser radar are adjacent to each other. For example, the selected key frame laser point clouds satisfy the following condition: a distance between center positions of the laser radar corresponding to adjacent key frame laser point clouds is a second preset distance greater than the first preset distance. The second preset distance is, for example, 8 m. In other words, the key frame laser point clouds may be sample frame laser point clouds that are spaced from each other by the second preset distance.

In this embodiment, in multiple key frame laser point clouds collected in a collection region, an adjustment amount corresponding to a key frame laser point cloud may be an amount of movement between a center position of the laser radar corresponding to the key frame laser point cloud after being merged with a second key frame laser point cloud and a center position of the laser radar corresponding to the key frame laser point cloud before merging, that is, the center position of the laser radar when the key frame laser point cloud is collected.

In this embodiment, an adjustment amount corresponding to a key frame laser point cloud may be calculated by using a preset laser point cloud merging algorithm.

For example, an adjustment amount corresponding to a key frame laser point cloud collected in a collection region is determined by using an iterative closest point (ICP) algorithm. When laser point clouds are merged by using the ICP algorithm, a frame laser point cloud is used as an original frame laser point cloud, another frame laser point cloud is used as a target frame laser point cloud, and the original frame laser point cloud is merged with the target frame laser point cloud by using the ICP algorithm. A key frame laser point cloud collected in a collection region and a second key frame laser point cloud merged with the key frame laser point cloud may be used as the original frame laser point cloud and the target frame laser point cloud respectively. When a key frame laser point cloud collected in a collection region is merged with a second key frame laser point cloud collected in the collection region by using the ICP algorithm, a transformation relationship between the key frame laser point cloud and the second key frame laser point cloud merged with the key frame laser point cloud is determined. An output result of the ICP algorithm includes the transformation relationship between the key frame laser point cloud and the second key frame laser point cloud merged with the key frame laser point cloud. The output result of the ICP algorithm may be acquired, so as to acquire the transformation relationship between the key frame laser point cloud and the second key frame laser point cloud merged with the key frame laser point cloud. The transformation relationship includes a translation relationship between a center position of the laser radar corresponding to the key frame laser point cloud and a center position of the laser radar corresponding to the second key frame laser point cloud merged with the key frame laser point cloud, and a rotation relationship between an Euler angle of the laser radar center corresponding to the key frame laser point cloud and an Euler angle of the laser radar center corresponding to the second key frame laser point cloud merged with the key frame laser point cloud. The translation relationship may be represented by a translation matrix, and the rotation relationship may be represented by a rotation matrix.

During the merging process, the ICP algorithm translates the center position of the laser radar corresponding to the key frame laser point cloud according to the translation relationship and rotates the Euler angle of the laser radar center corresponding to the key frame laser point cloud according to the rotation relationship, which is equivalent to translating and rotating the key frame laser point cloud according to the translation relationship and the rotation relationship, so that positions of laser points obtained by scanning the same spatial position in the key frame laser point cloud and the second key frame laser point cloud merged with the key frame laser point cloud coincide. After the center position of the laser radar corresponding to the key frame laser point cloud is translated according to the translation relationship, the center position of the laser radar corresponding to the key frame laser point cloud after being merged may be obtained, and thus the amount of movement between the center position of the laser radar corresponding to the key frame laser point cloud after being merged and the center position of the laser radar corresponding to the key frame laser point cloud may be obtained, so that the adjustment amount corresponding to the key frame laser point cloud may be determined.

In this embodiment, key frame laser point clouds may correspond to multiple adjustment amounts. In an example where six key frame laser point clouds are collected in a collection region and an adjustment amount of the first key frame laser point cloud is determined by using the ICP algorithm, when the first key frame laser point cloud is respectively merged with the second key frame laser point cloud, the third key frame laser point cloud, the fourth key frame laser point cloud, the fifth key frame laser point cloud, and the sixth key frame laser point cloud by using the ICP algorithm, five center positions of the laser radar corresponding to the first key frame laser point cloud after being merged may be obtained, and thus amounts of movement between the five center positions of the laser radar corresponding to the first key frame laser point cloud after being merged and the center position of the laser radar corresponding to the first key frame laser point cloud may be obtained, so that five adjustment amounts corresponding to the first key frame laser point cloud may be determined.

In some optional implementations of this embodiment, an average adjustment amount corresponding to each key frame laser point cloud collected in each collection region may be calculated respectively, and a key frame laser point cloud corresponding to the greatest average adjustment amount in the key frame laser point cloud collected in each collection region is calculated respectively, and an average adjustment amount of each of the remaining key frame laser point clouds collected in each collection region other than the key frame laser point cloud corresponding to the greatest average adjustment amount is recalculated respectively. A key frame laser point cloud corresponding to the smallest average adjustment amount in the remaining key frame laser point clouds collected in each collection region is used as the optimal key frame laser point cloud collected in each collection region.

An average adjustment amount corresponding to a key frame laser point cloud is obtained by dividing a sum of multiple adjustment amounts corresponding to the key frame laser point cloud by a number of other key frame laser point clouds merged with the key frame laser point cloud.

In an example where six key frame laser point clouds are collected collected in a collection region and an average adjustment amount of the first key frame laser point cloud in the six key frame laser point clouds is calculated by using the ICP algorithm, when the first key frame laser point cloud is respectively merged with the second key frame laser point cloud, the third key frame laser point cloud, the fourth key frame laser point cloud, the fifth key frame laser point cloud, and the sixth key frame laser point cloud by using the ICP algorithm, five adjustment amounts corresponding to the first key frame laser point cloud may be obtained. The average adjustment amount corresponding to the first key frame laser point cloud collected in the collection region may be obtained by dividing a sum of the five adjustment amounts corresponding to the first key frame laser point cloud by the number of other key frame laser point clouds merged with the first key frame laser point cloud, that is, 5.

After the average adjustment amount corresponding to each key frame laser point cloud collected in a collection region is calculated, a key frame laser point cloud corresponding to the greatest average adjustment amount in the key frame laser point cloud collected in the collection region may be determined. Then, an average adjustment amount of each of the remaining key frame laser point clouds collected in the collection region other than the key frame laser point cloud corresponding to the greatest average adjustment amount may be recalculated, and a key frame laser point cloud corresponding to the smallest average adjustment amount in the remaining key frame laser point clouds is used as the optimal key frame laser point cloud collected in the collection region.

In an example where six key frame laser point clouds are collected in a collection region and average adjustment amounts are calculated by using the ICP algorithm, when an average adjustment amount corresponding to each of the six key frame laser point clouds collected in the collection region is calculated by using the ICP algorithm, each key frame laser point cloud corresponds to five adjustment amounts. The average adjustment amount corresponding to the first key frame laser point cloud is the greatest. Accordingly, the first key frame laser point cloud may be removed, and the average adjustment amounts corresponding to the second to sixth key frame laser point clouds are recalculated. When the average adjustment amounts are recalculated, the second to sixth key frame laser point clouds each correspond to four adjustment amounts. After the recalculation, a key frame laser point cloud corresponding to the smallest average adjustment amount in the remaining key frame laser point clouds is used as the optimal key frame laser point cloud collected in the collection region.

At step 203, a global pose optimization is performed on a laser point cloud collected in each collection region other than the optimal key frame laser point cloud.

In this embodiment, after the optimal key frame laser point cloud in the key frame laser point clouds collected in each collection region is respectively determined, a global pose optimization may be respectively performed on a laser point cloud other than the optimal key frame laser point cloud in the laser point cloud used for constructing the reflectance map that is collected in each collection region, to obtain a position and an Euler angle, used for constructing the reflectance map, corresponding to each frame laser point cloud used for constructing the reflectance map that is collected in each collection region other than the optimal key frame laser point cloud.

In this embodiment, a position and an Euler angle of the laser radar center corresponding to the optimal key frame laser point cloud collected in each collection region may be used as the position and the Euler angle, used for constructing the reflectance map, corresponding to the optimal key frame laser point cloud collected in each collection region. In other words, because the average adjustment amount corresponding to the optimal key frame laser point cloud collected in each collection region is the smallest, the position and the Euler angle of the laser radar center corresponding to the optimal key frame laser point cloud, that is, the position and the Euler angle of the laser radar center that are obtained by using the GPS device and the inertial navigation device when the optimal key frame laser point cloud is collected are the most accurate. Therefore, the subsequent pose optimization is not performed on the optimal key frame laser point cloud collected in each collection region. Instead, the position and the Euler angle of the laser radar center corresponding to the optimal key frame laser point cloud collected in each collection region are directly used as the position and the Euler angle, used for constructing the reflectance map, corresponding to the optimal key frame laser point cloud collected in each collection region, so as to avoid such cases as that an optimized position and Euler angle of the laser radar center corresponding to the optimal key frame laser point cloud, which are obtained after the pose optimization is performed on the optimal key frame laser point cloud, are less accurate than the position and the Euler angle of the laser radar center that are obtained by using the GPS device and the inertial navigation device.

The process of performing a global pose optimization on a laser point cloud collected in each collection region other than the optimal key frame laser point cloud may be equivalent to translating and rotating the position and the Euler angle of the laser radar center corresponding to the laser point cloud collected in each collection region other than the optimal key frame laser point cloud, to obtain the position and the Euler angle, used for constructing the reflectance map, of the laser radar center corresponding to each frame laser point cloud used for constructing the reflectance map that is collected in each collection region other than the optimal key frame laser point cloud.

In some optional implementations of this embodiment, when the global pose optimization is performed on the laser point cloud collected in each collection region other than the optimal key frame laser point cloud, the pose optimization may be firstly performed on other key frame laser point clouds collected in each collection region other than the optimal key frame laser point cloud, to obtain the position and the Euler angle, used for constructing the reflectance map, corresponding to each of the other key frame laser point clouds collected in each collection region. Then, the pose optimization may be respectively performed on other sample frame laser point clouds other than the key frame laser point clouds in the sample frame laser point clouds collected in each collection region, to obtain the position and the Euler angle, used for constructing the reflectance map, of the laser radar center corresponding to each of the other sample frame laser point clouds in the sample frame laser point clouds collected in each collection region. Finally, the pose optimization may be respectively performed on regular frame laser point clouds other than the sample frame laser point clouds in the laser point cloud used for constructing the reflectance map that is collected in each collection region, to obtain a position and an Euler angle, used for constructing the reflectance map, of the laser radar center corresponding to each of the regular frame laser point clouds collected in each collection region.

In some optional implementations of this embodiment, when the pose optimization is performed on other key frame laser point clouds collected in a collection region other than the optimal key frame laser point cloud, an optimized position and Euler angle of the laser radar center corresponding to each of the other key frame laser point clouds that satisfy a convergence condition corresponding to the other key frame laser point clouds collected in the collection region may be calculated based on a constraint condition corresponding to the other key frame laser point clouds collected in the collection region, and the optimized position and Euler angle of the laser radar center corresponding to each of the other key frame laser point clouds that satisfy the convergence condition corresponding to the other key frame laser point clouds collected in the collection region are used as the position and the Euler angle, used for constructing the reflectance map, of the laser radar center corresponding to the each of the other key frame laser point clouds. The constraint condition corresponding to the other key frame laser point clouds collected in the collection region may include: the position and the Euler angle of the laser radar center corresponding to each of the other key frame laser point clouds collected in the collection region other than the optimal key frame laser point cloud, a weight corresponding to the position and the Euler angle of the laser radar center corresponding to the other key frame laser point clouds, a transformation relationship between the other key frame laser point clouds collected in the collection region, and a transformation relationship between other key frame laser point clouds respectively collected in an overlap region between the collection region and a second collection region.

The transformation relationship between the other key frame laser point clouds collected in the collection region includes: a transformation relationship between any two key frame laser point clouds collected in the collection region. The transformation relationship between other key frame laser point clouds respectively collected in an overlap region between the collection region and a second collection region includes: a transformation relationship between any other key frame laser point clouds respectively collected in the overlap region between the collection region and the second collection region.

In this embodiment, transformation relationships between other key frame laser point clouds collected in a collection region before and after optimization may be respectively determined by using the preset laser point cloud merging algorithm, and transformation relationships between other key frame laser point clouds respectively collected in an overlap region between the collection region and a second collection region before and after optimization may be respectively determined by using the preset laser point cloud merging algorithm.

For example, a collection region is the first collection region, there is an overlap region between the collection region and the second collection region, and the transformation relationship between the other key frame laser point clouds is determined by using the ICP algorithm. In this example, six key frame laser point clouds are collected in the first collection region, six key frame laser point clouds are collected in the second collection region, and laser point clouds respectively collected in the overlap region between the first collection region and the second collection region include: the fourth key frame laser point cloud, the fifth key frame laser point cloud and the sixth key frame laser point cloud collected in the first collection region, and the first key frame laser point cloud, the second key frame laser point cloud and the third key frame laser point cloud collected in the second collection region. An optimal key frame laser point cloud collected in the first collection region is the second key frame laser point cloud, and an optimal key frame laser point cloud collected in the second collection region is the fifth key frame laser point cloud.

The constraint condition corresponding to the other key frame laser point clouds collected in the collection region, namely, the first collection region includes: a transformation relationship, respectively determined by the ICP algorithm when any other key frame laser point cloud in the six key frame laser point clouds collected in the first collection region is respectively merged with four other key frame laser point clouds collected in the first collection region other than the second key frame laser point cloud collected in the first collection region by using the ICP algorithm, between the key frame laser point cloud and each of the four other key frame laser point clouds; and a transformation relationship, respectively determined by the ICP algorithm when any other key frame laser point cloud in the three other key frame laser point clouds collected in the overlap region between the first collection region and the second collection region when the laser point cloud is collected in the first collection region is merged with any other key frame laser point cloud in the three other key frame laser point clouds collected in the overlap region between the first collection region and the second collection region when the laser point cloud is collected in the second collection region by using the ICP algorithm.

When the pose optimization is performed, based on a constraint condition corresponding to other key frame laser point clouds collected in a collection region, on the other key frame laser point clouds collected in the collection region other than the optimal key frame laser point cloud, the positions and the Euler angles, used for constructing the reflectance map, of the laser radar centers corresponding to the other key frame laser point clouds collected in the collection region need to be made as close as possible to the positions and the Euler angles of the the laser radar centers corresponding to the other key frame laser point clouds collected in the collection region, that is, the positions and the Euler angles of the laser radar centers when the other key frame laser point clouds are collected in the collection region. In addition, a transformation relationship between the other key frame laser point clouds collected in the collection region after optimization needs to be made as close as possible to a transformation relationship between the other key frame laser point clouds collected in the collection region before optimization, and a transformation relationship between other key frame laser point clouds respectively collected in an overlap region between the collection region and a second collection region after optimization needs to be made as close as possible to a transformation relationship between a transformation relationship between other key frame laser point clouds respectively collected in the overlap region between the collection region and the second collection region before optimization.

The process of calculating, based on a constraint condition corresponding to other key frame laser point clouds collected in a collection region, an optimized position and Euler angle of the laser radar center corresponding to each of the other key frame laser point clouds that satisfies a convergence condition corresponding to the other key frame laser point clouds collected in the collection region may be equivalent to translating and rotating the position and the Euler angle of the laser radar center corresponding to each of the other key frame laser point clouds collected in the collection region, until the convergence condition corresponding to the other key frame laser point clouds collected in the collection region is satisfied, to obtain the optimized position and Euler angle of the laser radar center corresponding to each of the other key frame laser point clouds collected in the collection region. The optimized position and Euler angle of the laser radar center corresponding to each of the other key frame laser point clouds collected in the collection region are used as the position and the Euler angle, used for constructing the reflectance map, of the laser radar center corresponding to the each of the other key frame laser point clouds collected in the collection region.

In this embodiment, a target function may be constructed based on a constraint condition corresponding to other key frame laser point clouds collected in a collection region, where a convergence condition corresponding to the other key frame laser point clouds may be that a function value of the target function constructed based on the constraint condition corresponding to the other key frame laser point clouds collected in the collection region is less than a threshold. The process of calculating, based on the constraint condition corresponding to the other key frame laser point clouds collected in the collection region, the optimized position and Euler angle of the laser radar center corresponding to each of the other key frame laser point clouds that satisfy the convergence condition corresponding to the other key frame laser point clouds may be equivalent to translating and rotating the position and the Euler angle of the laser radar center corresponding to each of the other key frame laser point clouds, until the function value of the target function is less than the threshold.

In some optional implementations of this embodiment, a convergence condition corresponding to other key frame laser point clouds collected in a collection region includes: a sum of a pose differential corresponding to the other key frame laser point clouds, a first transformation relationship differential corresponding to the other key frame laser point clouds, and a second transformation relationship differential corresponding to the other key frame laser point clouds is less than a threshold. The pose differential corresponding to the other key frame laser point clouds is a sum of differentials between the optimized position and Euler angle of the laser radar center corresponding to each of the other key frame laser point clouds collected in the collection region and the position and the Euler angle of the laser radar center corresponding to the each of the other key frame laser point clouds before optimization. The first transformation relationship differential corresponding to the other key frame laser point clouds is a sum of differentials between transformation relationships between any two other key frame laser point clouds collected in the collection region after optimization and transformation relationships between any two other key frame laser point clouds before optimization. The second transformation relationship differential corresponding to the other key frame laser point clouds is a sum of differentials between transformation relationships between other key frame laser point clouds respectively collected in an overlap region between the collection region and a second collection region after optimization and transformation relationships between other key frame laser point clouds respectively collected in the overlap region between the collection region and the second collection region before optimization.

A differential between a transformation relationship between any two other key frame laser point clouds collected in the collection region after optimization and a transformation relationship between any two other key frame laser point clouds before optimization may be determined based on differentials between a translation amount and a rotation amount corresponding to the transformation relationship between the any two other key frame laser point clouds after optimization and a translation amount and a rotation amount corresponding to the transformation relationship between the any two other key frame laser point clouds before optimization.

A differential between a transformation relationship between any other key frame laser point clouds respectively collected in the overlap region between the collection region and the second collection region after optimization and a transformation relationship between any other key frame laser point clouds respectively collected in the overlap region between the collection region and the second collection region before optimization may be determined based on differentials between a translation amount and a rotation amount corresponding to the transformation relationship between the any other key frame laser point clouds respectively collected in the overlap region between the collection region and the second collection region after optimization and a translation amount and a rotation amount corresponding to the transformation relationship between the any other key frame laser point clouds respectively collected in the overlap region between the collection region and the second collection region before optimization.

In a constraint condition corresponding to other key frame laser point clouds collected in a collection region, a weight corresponding to a position and an Euler angle of the laser radar center corresponding to the other key frame laser point clouds may be used as a weight of a pose differential corresponding to the other key frame laser point clouds.

After the pose optimization is respectively performed on the other key frame laser point clouds collected in each collection region other than the optimal key frame laser point cloud, to obtain the position and the Euler angle, used for constructing the reflectance map, corresponding to each of the other key frame laser point clouds collected in each collection region, the pose optimization may be respectively performed on other sample frame laser point clouds other than the key frame laser point clouds in the sample frame laser point clouds collected in each collection region, to obtain a position and an Euler angle, used for constructing the reflectance map, of the laser radar center corresponding to each of the other sample frame laser point clouds other than the key frame laser point clouds in the sample frame laser point clouds collected in each collection region.

In some optional implementations of this embodiment, when the pose optimization is performed on other sample frame laser point clouds other than a key frame laser point cloud in sample frame laser point clouds collected in a collection region, an optimized position and Euler angle of the laser radar center corresponding to each of the other sample frame laser point clouds that satisfy a convergence condition corresponding to the other sample frame laser point clouds collected in the collection region may be calculated based on a constraint condition corresponding to the other sample frame laser point clouds collected in the collection region, and the optimized position and Euler angle of the laser radar center corresponding to each of the other sample frame laser point clouds collected in the collection region that satisfy the convergence condition corresponding to the other sample frame laser point clouds collected in the collection region are used as the position and the Euler angle, used for constructing the reflectance map, of the laser radar center corresponding to the each of the other sample frame laser point clouds collected in the collection region.

A constraint condition corresponding to other sample frame laser point clouds collected in a collection region includes: a position and an Euler angle of the laser radar center corresponding to each of the other sample frame laser point clouds collected in the collection region, a weight corresponding to the position and the Euler angle of the laser radar center corresponding to the other sample frame laser point clouds, and a transformation relationship between adjacent other sample frame laser point clouds in the other sample frame laser point clouds collected in the collection region. Adjacent other sample frame laser point clouds are other sample frame laser point clouds, of which the corresponding center positions of the laser radar are adjacent to each other.

In this embodiment, transformation relationships between adjacent other sample frame laser point clouds collected in a collection region before and after optimization may be respectively determined by using the preset laser point cloud merging algorithm such as the ICP algorithm.

A transformation relationship between adjacent sample frame laser point clouds in other sample frame laser point clouds collected in a collection region includes: a transformation relationship between any two adjacent other sample frame laser point clouds in the other sample frame laser point clouds collected in the collection region.

When the pose optimization is performed, based on a constraint condition corresponding to other sample frame laser point clouds collected in a collection region, on the other sample frame laser point clouds collected in the collection region, the positions and the Euler angles, used for constructing the reflectance map, of the laser radar centers corresponding to the other sample frame laser point clouds collected in the collection region need to be made as close as possible to the positions and the Euler angles of the laser radar centers corresponding to the other sample frame laser point clouds collected in the collection region before optimization. In addition, a transformation relationship between adjacent other sample frame laser point clouds collected in the collection region after optimization needs to be made as close as possible to a transformation relationship between adjacent other sample frame laser point clouds collected in the collection region before optimization.

The process of calculating, based on a constraint condition corresponding to other sample frame laser point clouds collected in a collection region, an optimized position and Euler angle of the laser radar center corresponding to each of the other sample frame laser point clouds that satisfy a convergence condition corresponding to the other sample frame laser point clouds collected in the collection region may be equivalent to translating and rotating the position and the Euler angle of the laser radar center corresponding to each of the other sample frame laser point clouds, until the convergence condition corresponding to the other sample frame laser point clouds collected in the collection region is satisfied, to obtain the optimized position and Euler angle of the laser radar center corresponding to each of the other sample frame laser point clouds. The optimized position and Euler angle of the laser radar center corresponding to each of the other sample frame laser point clouds are used as the position and the Euler angle, used for constructing the reflectance map, of the laser radar center corresponding to the each of the other sample frame laser point clouds.

In this embodiment, a target function may be constructed based on a constraint condition corresponding to other sample frame laser point clouds collected in a collection region, where a convergence condition corresponding to the other sample frame laser point clouds may be that a function value of the target function constructed based on the constraint condition corresponding to the other sample frame laser point clouds collected in the collection region is less than a threshold. The process of calculating, based on the constraint condition corresponding to the other sample frame laser point clouds collected in the collection region, the optimized position and Euler angle of the laser radar center corresponding to each of the other sample frame laser point clouds that satisfy the convergence condition corresponding to the other sample frame laser point clouds may be equivalent to translating and rotating the position and the Euler angle of the laser radar center corresponding to each of the other sample frame laser point clouds, until the function value of the target function is less than the threshold.

In some optional implementations of this embodiment, a convergence condition corresponding to other sample frame laser point clouds collected in a collection region includes: a sum of a pose differential corresponding to the other sample frame laser point clouds and a transformation relationship differential corresponding to the other sample frame laser point clouds is less than a threshold. The pose differential corresponding to the other sample frame laser point clouds is a sum of differentials between the optimized position and Euler angle of the laser radar center corresponding to each of the other sample frame laser point clouds collected in the collection region and the position and the Euler angle of the laser radar center corresponding to the each of the other sample frame laser point clouds before optimization. The transformation relationship differential corresponding to the other sample frame laser point clouds is a sum of differentials between transformation relationships between adjacent other sample frame laser point clouds collected in the collection region after optimization and transformation relationships between adjacent other sample frame laser point clouds before optimization.

A differential between a transformation relationship between adjacent other sample frame laser point clouds after optimization and a transformation relationship between adjacent other sample frame laser point clouds before optimization may be determined according to differentials between a translation amount and a rotation amount corresponding to the transformation relationship between the adjacent other sample frame laser point clouds after optimization and a translation amount and a rotation amount corresponding to the transformation relationship between the adjacent other sample frame laser point clouds before optimization.

In a constraint condition corresponding to other sample frame laser point clouds collected in a collection region, a weight corresponding to a position and an Euler angle of the laser radar center corresponding to the other sample frame laser point clouds may be used as a weight of a pose differential corresponding to the other sample frame laser point clouds.

After the pose optimization is respectively performed on the other sample frame laser point clouds collected in each collection region other than the key frame laser point cloud, to obtain the position and the Euler angle, used for constructing the reflectance map, of the laser radar center corresponding to each of the other sample frame laser point clouds collected in each collection region, the pose optimization may be respectively performed on regular frame laser point clouds other than the sample frame laser point clouds in the laser point cloud used for constructing the reflectance map that is collected in each collection region, to obtain a position and an Euler angle, used for constructing the reflectance map, of the laser radar center corresponding to each of the regular frame laser point clouds.

In some optional implementations of this embodiment, when the pose optimization is respectively performed on the regular frame laser point clouds other than the sample frame laser point clouds in the laser point cloud used for constructing the reflectance map that is collected in each collection region, the pose optimization may be respectively performed on the regular frame laser point clouds in the laser point cloud used for constructing the reflectance map based on a constraint condition corresponding to the regular frame laser point clouds in the laser point cloud used for constructing the reflectance map that is collected in each collection region, to obtain an optimized position and Euler angle of the laser radar center corresponding to each of the regular frame laser point clouds used for constructing the reflectance map that are collected in each collection region. The optimized position and Euler angle each of the regular frame laser point clouds collected in each collection region are used as a position and an Euler angle, used for constructing the reflectance map, of the laser radar center corresponding to the each of the regular frame laser point clouds. The constraint condition corresponding to the regular frame laser point clouds collected in the collection region includes: the position and the Euler angle of the laser radar center corresponding to each of the regular frame laser point clouds collected in the collection region, a weight corresponding to the position and the Euler angle of the laser radar center corresponding to the regular frame laser point clouds, and a transformation relationship between adjacent regular frame laser point clouds collected in the collection region. Adjacent regular frame laser point clouds are regular frame laser point clouds, of which the corresponding center positions of the laser radar are adjacent to each other.

In this embodiment, transformation relationships between adjacent regular frame laser point clouds collected in a collection region before and after optimization may be respectively determined by using the preset laser point cloud merging algorithm such as the ICP algorithm.

A transformation relationship between adjacent regular frame laser point clouds collected in a collection region includes: a transformation relationship between any two adjacent regular frame laser point clouds collected in the collection region.

When the pose optimization is performed, based on a constraint condition corresponding to regular frame laser point clouds collected in a collection region, on the regular frame laser point clouds collected in the collection region, the positions and the Euler angles, used for constructing the reflectance map, of the laser radar centers corresponding to the regular frame laser point clouds collected in the collection region need to be made as close as possible to the positions and the Euler angles of the laser radar centers corresponding to the regular frame laser point clouds. In addition, a transformation relationship between adjacent regular frame laser point clouds after optimization needs to be made as close as possible to a transformation relationship between adjacent regular frame laser point clouds before optimization.

The process of calculating, based on a constraint condition corresponding to regular frame laser point clouds collected in a collection region, an optimized position and Euler angle of the laser radar center corresponding to each of the regular frame laser point clouds that satisfy a convergence condition corresponding to the regular frame laser point clouds collected in the collection region may be equivalent to translating and rotating the position and the Euler angle of the laser radar center corresponding to each of the regular frame laser point clouds, until the convergence condition corresponding to the regular frame laser point clouds collected in the collection region is satisfied, to obtain the optimized position and Euler angle of the laser radar center corresponding to each of the regular frame laser point clouds. The optimized position and Euler angle of the laser radar center corresponding to each of the regular frame laser point clouds collected in the collection region are used as the position and the Euler angle, used for constructing the reflectance map, of the laser radar center corresponding to the each of the regular frame laser point clouds collected in the collection region.

In this embodiment, a target function may be constructed based on a constraint condition corresponding to regular frame laser point clouds collected in a collection region, where a convergence condition corresponding to the regular frame laser point clouds may be that a function value of the target function constructed based on the constraint condition corresponding to the regular frame laser point clouds collected in the collection region is less than a threshold. The process of calculating, based on the constraint condition corresponding to the regular frame laser point clouds collected in the collection region, the optimized position and Euler angle of the laser radar center corresponding to each of the regular frame laser point clouds that satisfy the convergence condition corresponding to the regular frame laser point clouds may be equivalent to translating and rotating the position and the Euler angle of the laser radar center corresponding to each of the regular frame laser point clouds, until the function value of the target function is less than the threshold.

In some optional implementations of this embodiment, a convergence condition corresponding to regular frame laser point clouds collected in a collection region includes: a sum of a pose differential corresponding to the regular frame laser point clouds and a transformation relationship differential corresponding to the regular frame laser point clouds is less than a threshold. The pose differential corresponding to the regular frame laser point clouds is a sum of differentials between the optimized position and Euler angle of the laser radar center corresponding to each of the regular frame laser point clouds collected in the collection region and the position and the Euler angle of the laser radar center corresponding to the each of the regular frame laser point clouds before optimization. The transformation relationship differential corresponding to the regular frame laser point clouds is a sum of differentials between transformation relationships between adjacent regular frame laser point clouds collected in the collection region after optimization and transformation relationships between adjacent regular frame laser point clouds before optimization.

A differential between a transformation relationship between adjacent regular frame laser point clouds after optimization and a transformation relationship between adjacent regular frame laser point clouds before optimization may be determined according to differentials between a translation amount and a rotation amount corresponding to the transformation relationship between the adjacent regular frame laser point clouds after optimization and a translation amount and a rotation amount corresponding to the transformation relationship between the adjacent regular frame laser point clouds before optimization.

In a constraint condition corresponding to regular frame laser point clouds collected in a collection region, a weight corresponding to a position and an Euler angle of the laser radar center corresponding to the regular frame laser point clouds may be used as a weight of a pose differential corresponding to the regular frame laser point clouds.

At step 204, the reflectance map is constructed based on the position and the Euler angle, used for constructing the reflectance map, of the corresponding center of the laser radar.

In this embodiment, after the position and the Euler angle, used for constructing the reflectance map, corresponding to each frame laser point cloud used for constructing the reflectance map that is collected in the collection region are obtained, coordinates, output by the laser radar, in a laser radar coordinate system of laser points in laser point cloud data corresponding to each frame laser point cloud used for constructing the reflectance map that is collected in each collection region may be transformed by using the position and the Euler angle, used for constructing the reflectance map, of the laser radar center corresponding to each frame laser point cloud used for constructing the reflectance map that is collected in each collection region, to obtain coordinates in a world coordinate system of the laser points in each frame laser point cloud used for constructing the reflectance map that is collected in each collection region. Then, according to the coordinates in the world coordinate system of the laser points in each frame laser point cloud used for constructing the reflectance map that is collected in each collection region, each frame laser point cloud used for constructing the reflectance map that is collected in each collection region is merged, to obtain a merged laser point cloud corresponding to the to-be-constructed reflectance map. Laser points in the merged laser point cloud corresponding to the to-be-constructed reflectance map are projected into a grid occupied by the region corresponding to the to-be-constructed reflectance map, and a mean and variance of reflection strengths of laser points projected into each grid occupied by the region are calculated, to obtain map data of the to-be-constructed reflectance map, so as to construct the reflectance map of the region.

In this embodiment, a position used for constructing the reflectance map corresponding to a frame laser point cloud used for constructing the reflectance map may be represented by coordinates in the world coordinate system, and coordinates of a position used for constructing the reflectance map corresponding to a frame laser point cloud used for constructing the reflectance map in the world coordinate system may include x-axis, y-axis, and z-axis values of the position used for constructing the reflectance map corresponding to the frame laser point cloud used for constructing the reflectance map.

In this embodiment, a translation matrix corresponding to each frame laser point cloud used for constructing the reflectance map that is collected in each collection region may be respectively calculated according to coordinates in the world coordinate system of a position used for constructing the reflectance map corresponding to the each frame laser point cloud used for constructing the reflectance map that is collected in each collection region. A rotation matrix corresponding to each frame laser point cloud used for constructing the reflectance map that is collected in each collection region may be respectively obtained according to an Euler angle used for constructing the reflectance map corresponding to the each frame laser point cloud used for constructing the reflectance map that is collected in each collection region. Then, coordinates, output by the laser radar, of each laser point in in laser point cloud data corresponding to each frame laser point cloud used for constructing the reflectance map in the laser radar coordinate system may be respectively transformed according to the rotation matrix and the translation matrix corresponding to the each frame laser point cloud used for constructing the reflectance map that is collected in each collection region, to obtain coordinates of the each frame laser point cloud used for constructing the reflectance map that is collected in each collection region in the world coordinate system.

In this embodiment, the world coordinate system may be a Universal Transverse Mercator (UTM) coordinate system.

In this embodiment, after the coordinates in the world coordinate system of the laser points in each frame laser point cloud used for constructing the reflectance map that is collected in each collection region are obtained, each frame laser point cloud used for constructing the reflectance map that is collected in each collection region may be merged according to the coordinates in the world coordinate system of the laser points in each frame laser point cloud used for constructing the reflectance map that is collected in each collection region, to obtain a merged laser point cloud corresponding to the to-be-constructed reflectance map. Then, according to x-axis and y-axis values of coordinates in the world coordinate system of laser points in the merged laser point cloud corresponding to the to-be-constructed reflectance map and lengths of a grid in the x-axis direction and the y-axis direction, for example, the length of side of the grid when the grid is square, a grid that is occupied by the region corresponding to the to-be-constructed reflectance map and to which laser points in each merged laser point cloud corresponding to the to-be-constructed reflectance map are projected may be determined respectively, and a mean and variance of reflection strengths of laser points projected into each grid occupied by the region corresponding to the to-be-constructed reflectance map are calculated respectively, so as to obtain the map data of the to-be-constructed reflectance map and construct the reflectance map.

Figure 3:
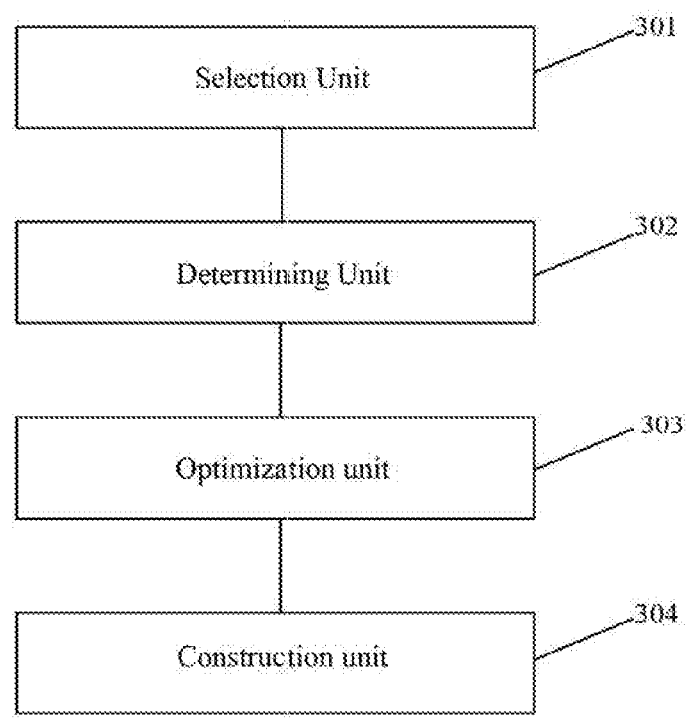
FIG. 3 is a schematic structural diagram of an apparatus for constructing a reflectance map according to an embodiment of the present application.

Referring to FIG. 3, as an implementation of the methods shown in the above-mentioned figures, the present application provides an embodiment of an apparatus for constructing a reflectance map. This apparatus embodiment corresponds to the method embodiment shown in FIG. 2.

As shown in FIG. 3, the apparatus for constructing a reflectance map includes: a selection unit 301, a determining unit 302, an optimization unit 303, and a construction unit 304. The selection unit 301 is configured to respectively select, from a laser point cloud collected in each collection region in a region corresponding to a to-be-constructed reflectance map, a laser point cloud used for constructing a reflectance map, and respectively select sample frame laser point clouds from the laser point cloud used for constructing the reflectance map that is collected in each collection region. The determining unit 302 is configured to respectively select a key frame laser point cloud from the sample frame laser point clouds collected in each collection region, and respectively determine, based on an adjustment amount corresponding to the key frame laser point cloud collected in each collection region, an optimal key frame laser point cloud collected in each collection region, the adjustment amount being determined based on an amount of movement between a center position of a laser radar corresponding to the key frame laser point cloud after being merged with a second key frame laser point cloud and a center position of the laser radar corresponding to the key frame laser point cloud. The optimization unit 303 is configured to respectively perform a global pose optimization on a laser point cloud other than the key frame laser point cloud in the laser point cloud used for constructing the reflectance map that is collected in each collection region, to obtain a position and an Euler angle, used for constructing the reflectance map, of the laser radar center corresponding to each frame laser point cloud used for constructing the reflectance map that is collected in each collection region. The construction unit 304 is configured to construct the reflectance map based on the position and the Euler angle, used for constructing the reflectance map, of the laser radar center corresponding to the each frame laser point cloud used for constructing the reflectance map that is collected in each collection region.

In some optional implementations of this embodiment, the selection unit is further configured to: remove a laser point cloud having a collection time with an erroneous timestamp, from the laser point cloud collected in the collection region; remove a laser point cloud having an identical center position as the center position of the laser radar, from the laser point cloud collected in the collection region; and use the remaining laser point clouds in the laser point cloud collected in the collection region, as the laser point cloud used for constructing the reflectance map that is collected in the collection region.

In some optional implementations of this embodiment, the determining unit is further configured to: calculate an average adjustment amount of each key frame laser point cloud collected in the collection region, wherein the average adjustment amount is obtained by dividing a sum of the adjustment amounts corresponding to the key frame laser point cloud by a number of other key frame laser point clouds merged with the key frame laser point cloud; determine a key frame laser point cloud corresponding to the greatest average adjustment amount, and calculate average adjustment amounts of remaining key frame laser point clouds other than the key frame laser point cloud corresponding to the greatest average adjustment amount; and use a key frame laser point cloud corresponding to a smallest average adjustment amount in the remaining key frame laser point clouds as the optimal key frame laser point cloud collected in the collection region.

In some optional implementations of this embodiment, the optimization unit includes: an other-key-frame optimization subunit, configured to use a position and an Euler angle of the laser radar center corresponding to the optimal key frame laser point cloud collected in each collection region as a position and an Euler angle, used for constructing the reflectance map, of the laser radar center corresponding to the optimal key frame laser point cloud collected in each collection region, and respectively perform the pose optimization on other key frame laser point clouds collected in each collection region other than the optimal key frame laser point cloud, to obtain a position and an Euler angle, used for constructing the reflectance map, of the laser radar center corresponding to each of the other key frame laser point clouds collected in each collection region; an other-sample-frame optimization subunit, configured to respectively perform the pose optimization on other sample frame laser point clouds collected in each collection region other than the key frame laser point cloud, to obtain a position and an Euler angle, used for constructing the reflectance map, of the laser radar center corresponding to each of the other sample frame laser point clouds collected in each collection region; and a regular-frame optimization subunit, configured to respectively perform the pose optimization on regular frame laser point clouds other than the sample frame laser point clouds in the laser point cloud used for constructing the reflectance map that is collected in each collection region, to obtain a position and an Euler angle, used for constructing the reflectance map, of the laser radar center corresponding to each of the regular frame laser point clouds collected in each collection region.

In some optional implementations of this embodiment, the other-key-frame optimization subunit is further configured to: calculate, based on a constraint condition corresponding to the other key frame laser point clouds collected in the collection region, an optimized position and Euler angle of the laser radar center corresponding to each of the other key frame laser point clouds that satisfy a convergence condition corresponding to the other key frame laser point clouds, where the constraint condition corresponding to the other key frame laser point clouds includes: the position and the Euler angle of the laser radar center corresponding to each of the other key frame laser point clouds, a weight corresponding to the position and the Euler angle of the laser radar center corresponding to the other key frame laser point clouds, a transformation relationship between the other key frame laser point clouds collected in the collection region, and a transformation relationship between other key frame laser point clouds respectively collected in an overlap region between the collection region and a second collection region; and use the optimized position and Euler angle of the laser radar center corresponding to each of the other key frame laser point clouds that satisfy the convergence condition corresponding to the other key frame laser point clouds as the position and the Euler angle, used for constructing the reflectance map, of the laser radar center corresponding to the each of the other key frame laser point clouds.

In some optional implementations of this embodiment, the convergence condition corresponding to the other key frame laser point clouds includes: a sum of a pose differential corresponding to the other key frame laser point clouds, a first transformation relationship differential corresponding to the other key frame laser point clouds, and a second transformation relationship differential corresponding to the other key frame laser point clouds is less than a threshold, the pose differential corresponding to the other key frame laser point clouds is a sum of differentials between the optimized position and Euler angle of the laser radar center corresponding to each of the other key frame laser point clouds and the position and the Euler angle of the laser radar center corresponding to the each of the other key frame laser point clouds before optimization, the first transformation relationship differential corresponding to the other key frame laser point clouds is a sum of differentials between transformation relationships between any two other key frame laser point clouds collected in the collection region after optimization and transformation relationships between any two other key frame laser point clouds before optimization, the second transformation relationship differential corresponding to the other key frame laser point clouds is a sum of differentials between transformation relationships between any other key frame laser point clouds respectively collected in an overlap region between the collection region and a second collection region after optimization and transformation relationships between any other key frame laser point clouds respectively collected in the overlap region between the collection region and the second collection region before optimization, and a weight corresponding to the position and the Euler angle of the laser radar center corresponding to the other key frame laser point clouds is a weight of the pose differential corresponding to the other key frame laser point clouds.

In some optional implementations of this embodiment, the other-sample-frame optimization subunit is further configured to: calculate, based on a constraint condition corresponding to the other sample frame laser point clouds collected in the collection region, an optimized position and Euler angle of the laser radar center corresponding to each of the other sample frame laser point clouds collected in the collection region that satisfy a convergence condition corresponding to the other sample frame laser point clouds, where the constraint condition corresponding to the other sample frame laser point clouds includes: the position and the Euler angle of the laser radar center corresponding to each of the other sample frame laser point clouds, a weight corresponding to the position and the Euler angle of the laser radar center corresponding to the other sample frame laser point clouds, and a transformation relationship between adjacent other sample frame laser point clouds; and use the optimized position and Euler angle of the laser radar center corresponding to each of the other sample frame laser point clouds collected in the collection region that satisfy the convergence condition corresponding to the other sample frame laser point clouds as the position and the Euler angle, used for constructing the reflectance map, of the laser radar center corresponding to the each of the other sample frame laser point clouds.

In some optional implementations of this embodiment, the convergence condition corresponding to the other sample frame laser point clouds includes: a sum of a pose differential corresponding to the other sample frame laser point clouds and a transformation relationship differential corresponding to the other sample frame laser point clouds is less than a threshold, the pose differential corresponding to the other sample frame laser point clouds is a sum of differentials between the optimized position and Euler angle of the laser radar center corresponding to each of the other sample frame laser point clouds and the position and the Euler angle of the laser radar center corresponding to the each of the other sample frame laser point clouds, the transformation relationship differential corresponding to the other sample frame laser point clouds is a sum of differentials between transformation relationships between adjacent other sample frame laser point clouds after optimization and transformation relationships between adjacent other sample frame laser point clouds before optimization, and the weight corresponding to the position and the Euler angle of the laser radar center corresponding to the other sample frame laser point clouds is a weight of the pose differential corresponding to the other sample frame laser point clouds.

In some optional implementations of this embodiment, the regular-frame optimization subunit is further configured to: calculate, based on a constraint condition corresponding to the regular frame laser point clouds other than the sample frame laser point clouds in the laser point cloud used for constructing the reflectance map that is collected in the collection region, an optimized position and Euler angle of the laser radar center corresponding to each of the regular frame laser point clouds collected in the collection region that satisfy a convergence condition corresponding to the regular frame laser point clouds, where the constraint condition corresponding to the regular frame laser point clouds includes: the position and the Euler angle of the laser radar center corresponding to each of the regular frame laser point clouds, a weight corresponding to the position and the Euler angle of the laser radar center corresponding to the regular frame laser point clouds, and a transformation relationship between adjacent regular frame laser point clouds; and use the optimized position and Euler angle of the laser radar center corresponding to each of the regular frame laser point clouds collected in the collection region that satisfy the convergence condition corresponding to the regular frame laser point clouds as the position and the Euler angle, used for constructing the reflectance map, of the laser radar center corresponding to the each of the regular frame laser point clouds.

In some optional implementations of this embodiment, the convergence condition corresponding to the regular frame laser point clouds comprises: a sum of a pose differential corresponding to the regular frame laser point clouds and a transformation relationship differential corresponding to the regular frame laser point clouds is less than a threshold, the pose differential corresponding to the regular frame laser point clouds is a sum of differentials between the optimized position and Euler angle of the laser radar center corresponding to each of the regular frame laser point clouds and the position and the Euler angle of the laser radar center corresponding to the each of the regular frame laser point clouds, the transformation relationship differential corresponding to the regular frame laser point clouds is a sum of differentials between transformation relationships between adjacent regular frame laser point clouds after optimization and transformation relationships between adjacent regular frame laser point clouds before optimization, and the weight corresponding to the position and the Euler angle of the laser radar center corresponding to the regular frame laser point clouds is a weight of the pose differential corresponding to the regular frame laser point clouds.

Figure 4:
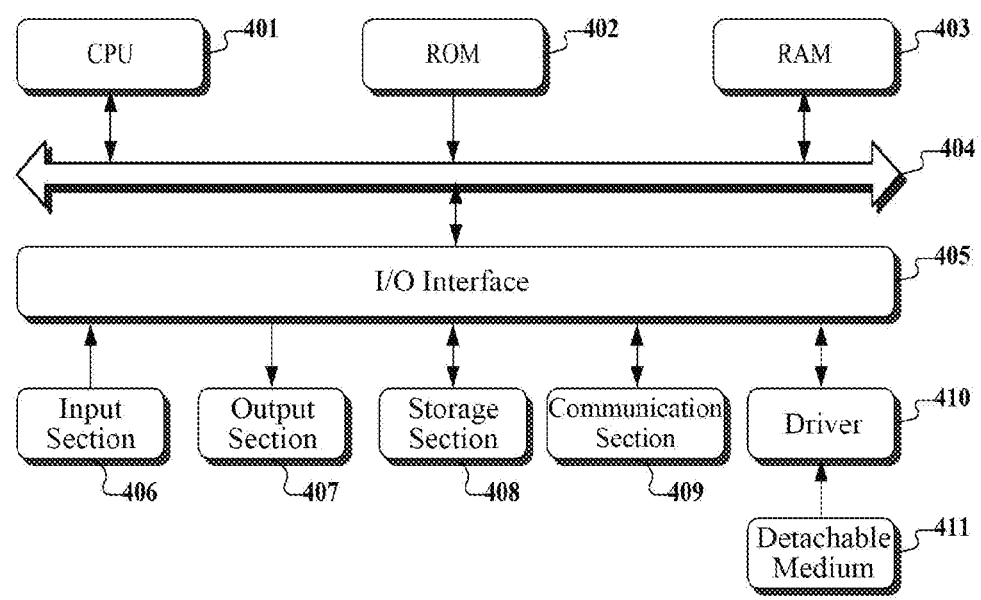
FIG. 4 is a schematic structural diagram of a computer system adapted to implement a server according to an embodiment of the present application.

Referring to FIG. 4, a schematic structural diagram of a computer system 400 adapted to implement a server of the embodiments of the present application is shown. The server shown in FIG. 4 is only an example, rather than limiting the functions and the usage range of the present application.

As shown in FIG. 4, the computer system 400 includes a central processing unit (CPU) 401, which may execute various appropriate actions and processes in accordance with a program stored in a read-only memory (ROM) 402 or a program loaded into a random access memory (RAM) 403 from a storage portion 408. The RAM 403 also stores various programs and data required by operations of the system 400. The CPU 401, the ROM 402 and the RAM 403 are connected to each other through a bus 404. An input/output (I/O) interface 405 is also connected to the bus 404.

The following components are connected to the I/O interface 405: an input portion 406 including a keyboard, a mouse etc.; an output portion 407 comprising a cathode ray tube (CRT), a liquid crystal display device (LCD), a speaker etc.; a storage portion 408 including a hard disk and the like; and a communication portion 409 comprising a network interface card, such as a LAN card and a modem. The communication portion 409 performs communication processes via a network, such as the Internet. A driver 410 is also connected to the I/O interface 405 as required. A removable medium 411, such as a magnetic disk, an optical disk, a magneto-optical disk, and a semiconductor memory, may be installed on the driver 410, to facilitate the retrieval of a computer program from the removable medium 411, and the installation thereof on the storage portion 408 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 409, and/or may be installed from the removable media 411. The computer program, when executed by the central processing unit (CPU) 401, implements the above mentioned functionalities as defined by the methods of the present application.

The present application provides a non-volatile computer storage medium, which may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: respectively selecting, from laser point clouds collected in each collection region in a region corresponding to a to-be-constructed reflectance map, laser point clouds used for constructing a reflectance map, and respectively selecting sample frame laser point clouds from the laser point cloud used for constructing the reflectance map collected in the each collection region; respectively selecting a key frame laser point cloud from the sample frame laser point clouds collected in the each collection region, and respectively determining, based on an adjustment amount corresponding to the key frame laser point cloud collected in the each collection region, an optimal key frame laser point cloud collected in the each collection region, the adjustment amount being determined based on an amount of movement between a center position of a laser radar corresponding to the key frame laser point cloud after being merged with a second key frame laser point cloud and a center position of the laser radar corresponding to the key frame laser point cloud; respectively performing a global pose optimization on a laser point cloud other than the key frame laser point cloud in the laser point cloud used for constructing the reflectance map collected in the each collection region, to obtain a position and an Euler angle, used for constructing the reflectance map, of a laser radar center corresponding to each frame laser point cloud used for constructing the reflectance map collected in the each collection region; and constructing the reflectance map based on the position and the Euler angle, used for constructing the reflectance map, of the laser radar center corresponding to the each frame laser point cloud used for constructing the reflectance map collected in the each collection region.

It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but is not limited to: a wireless medium, a wired medium, an optical cable medium, a RF medium and the like, or any combination thereof.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flowcharts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an selection unit, a determining unit, a optimization unit and a construction unit, where the names of these units or modules are not considered as a limitation to the units or modules. For example, the selection unit may also be described as "a unit for respectively selecting, from a laser point cloud collected in the each collection region in a region corresponding to a to-be-constructed reflectance map, a laser point cloud used for constructing a reflectance map, and respectively selecting sample frame laser point clouds from the laser point cloud used for constructing the reflectance map collected in each collection region."

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for constructing a reflectance map, comprising:
   respectively selecting, from laser point clouds collected in each collection region in a region corresponding to a to-be-constructed reflectance map, laser point clouds used for constructing a reflectance map, and respectively selecting sample frame laser point clouds from the laser point cloud used for constructing the reflectance map collected in the each collection region;
   respectively selecting a key frame laser point cloud from the sample frame laser point clouds collected in the each collection region, and respectively determining, based on an adjustment amount corresponding to the key frame laser point cloud collected in the each collection region, an optimal key frame laser point cloud collected in the each collection region, the adjustment amount being determined based on an amount of movement between a center position of a laser radar corresponding to the key frame laser point cloud after being merged with a second key frame laser point cloud and a center position of the laser radar corresponding to the key frame laser point cloud;
   respectively performing a global pose optimization on a laser point cloud other than the key frame laser point cloud in the laser point cloud used for constructing the reflectance map collected in the each collection region, to obtain a position and an Euler angle, used for constructing the reflectance map, of a laser radar center corresponding to each frame laser point cloud used for constructing the reflectance map collected in the each collection region; and
   constructing the reflectance map based on the position and the Euler angle, used for constructing the reflectance map, of the laser radar center corresponding to the each frame laser point cloud used for constructing the reflectance map collected in the each collection region.

2. The method according to claim 1, wherein the respectively selecting, from laser point clouds collected in each collection region in a region corresponding to a to-be-constructed reflectance map, laser point clouds used for constructing a reflectance map comprises:
   removing a laser point cloud having a collection time with an erroneous timestamp, from the laser point clouds collected in the collection region;
   removing a laser point cloud having an identical center position as the center position of the laser radar, from the laser point clouds collected in the collection region; and
   using remaining laser point clouds in the laser point clouds collected in the collection region, as the laser point clouds used for constructing the reflectance map collected in the collection region.

3. The method according to claim 2, wherein the respectively determining, based on an adjustment amount corresponding to the key frame laser point cloud collected in the each collection region, an optimal key frame laser point cloud collected in the each collection region comprises:
   calculating an average adjustment amount of each key frame laser point cloud collected in the collection region, wherein the average adjustment amount is obtained by dividing a sum of the adjustment amounts corresponding to the key frame laser point cloud by a number of other key frame laser point clouds merged with the key frame laser point cloud;
   determining a key frame laser point cloud corresponding to a greatest average adjustment amount, and calculating average adjustment amounts of remaining key frame laser point clouds other than the key frame laser point cloud corresponding to the greatest average adjustment amount; and using a key frame laser point cloud corresponding to a smallest average adjustment amount in the remaining key frame laser point clouds as the optimal key frame laser point cloud collected in the collection region.

4. The method according to claim 3, wherein the respectively performing a global pose optimization on a laser point cloud other than the key frame laser point cloud in the laser point cloud used for constructing the reflectance map collected in the each collection region comprises:

using a position and an Euler angle of a laser radar center corresponding to the optimal key frame laser point cloud collected in the each collection region as a position and an Euler angle, used for constructing the reflectance map, of the laser radar center corresponding to the optimal key frame laser point cloud collected in the each collection region, and respectively performing the pose optimization on other key frame laser point clouds collected in the each collection region other than the optimal key frame laser point cloud, to obtain a position and an Euler angle, used for constructing the reflectance map, of a laser radar center corresponding to each of the other key frame laser point clouds collected in the each collection region;

respectively performing the pose optimization on other sample frame laser point clouds collected in the each collection region other than the key frame laser point cloud, to obtain a position and an Euler angle, used for constructing the reflectance map, of a laser radar center corresponding to each of the other sample frame laser point clouds collected in the each collection region; and respectively performing the pose optimization on regular frame laser point clouds other than the sample frame laser point clouds in the laser point cloud used for constructing the reflectance map collected in the each collection region, to obtain a position and an Euler angle, used for constructing the reflectance map, of a laser radar center corresponding to each of the regular frame laser point clouds collected in the each collection region.

5. The method according to claim 4, wherein the respectively performing the pose optimization on other key frame laser point clouds collected in the each collection region other than the optimal key frame laser point cloud comprises:

calculating, based on a constraint condition corresponding to the other key frame laser point clouds collected in the collection region, an optimized position and Euler angle of a laser radar center corresponding to each of the other key frame laser point clouds that satisfy a convergence condition corresponding to the other key frame laser point clouds, wherein the constraint condition corresponding to the other key frame laser point clouds comprises: the position and the Euler angle of the laser radar center corresponding to each of the other key frame laser point clouds, a weight corresponding to the position and the Euler angle of the laser radar center corresponding to the other key frame laser point clouds, a transformation relationship between the other key frame laser point clouds collected in the collection region, and a transformation relationship between other key frame laser point clouds respectively collected in an overlap region between the collection region and a second collection region; and using the optimized position and Euler angle of the laser radar center corresponding to each of the other key frame laser point clouds that satisfy the convergence condition corresponding to the other key frame laser point clouds as the position and the Euler angle, used for constructing the reflectance map, of the laser radar center corresponding to the each of the other key frame laser point clouds.

6. The method according to claim 5, wherein the convergence condition corresponding to the other key frame laser point clouds comprises: a sum of a pose differential corresponding to the other key frame laser point clouds, a first transformation relationship differential corresponding to the other key frame laser point clouds, and a second transformation relationship differential corresponding to the other key frame laser point clouds is less than a threshold, the pose differential corresponding to the other key frame laser point clouds is a sum of differentials between the optimized position and Euler angle of the laser radar center corresponding to each of the other key frame laser point clouds and the position and the Euler angle of the laser radar center corresponding to the each of the other key frame laser point clouds, the first transformation relationship differential corresponding to the other key frame laser point clouds is a sum of differentials between transformation relationships between any two other key frame laser point clouds collected in the collection region after optimization and transformation relationships between any two other key frame laser point clouds before optimization, the second transformation relationship differential corresponding to the other key frame laser point clouds is a sum of differentials between transformation relationships between any other key frame laser point clouds respectively collected in an overlap region between the collection region and a second collection region after optimization and transformation relationships between any other key frame laser point clouds respectively collected in the overlap region between the collection region and the second collection region before optimization, and a weight corresponding to the position and the Euler angle of the laser radar center corresponding to the other key frame laser point clouds is a weight of the pose differential corresponding to the other key frame laser point clouds.

7. The method according to claim 6, wherein the respectively performing the pose optimization on other sample frame laser point clouds collected in the each collection region other than the key frame laser point cloud comprises:

calculating, based on a constraint condition corresponding to the other sample frame laser point clouds collected in the collection region, an optimized position and Euler angle of a laser radar center corresponding to each of the other sample frame laser point clouds collected in the collection region that satisfy a convergence condition corresponding to the other sample frame laser point clouds, wherein the constraint condition corresponding to the other sample frame laser point clouds comprises: the position and the Euler angle of the laser radar center corresponding to each of the other sample frame laser point clouds, a weight corresponding to the position and the Euler angle of the laser radar center corresponding to the other sample frame laser point clouds, and a transformation relationship between adjacent other sample frame laser point clouds; and using the optimized position and Euler angle of the laser radar center corresponding to each of the other sample frame laser point clouds collected in the collection region that satisfy the convergence condition corresponding to the other sample frame laser point clouds as the position and the Euler angle, used for constructing the reflectance map, of the laser radar center corresponding to the each of the other sample frame laser point clouds.

8. The method according to claim 7, wherein the convergence condition corresponding to the other sample frame laser point clouds comprises: a sum of a pose differential corresponding to the other sample frame laser point clouds and a transformation relationship differential corresponding to the other sample frame laser point clouds is less than a threshold, the pose differential corresponding to the other sample frame laser point clouds is a sum of differentials between the optimized position and Euler angle of the laser radar center corresponding to each of the other sample frame laser point clouds and the position and the Euler angle of the laser radar center corresponding to the each of the other sample frame laser point clouds, the transformation relationship differential corresponding to the other sample frame laser point clouds is a sum of differentials between transformation relationships between adjacent other sample frame laser point clouds after optimization and transformation relationships between adjacent other sample frame laser point clouds before optimization, and the weight corresponding to the position and the Euler angle of the laser radar center corresponding to the other sample frame laser point clouds is a weight of the pose differential corresponding to the other sample frame laser point clouds.

9. The method according to claim 8, wherein the respectively performing the pose optimization on regular frame laser point clouds other than the sample frame laser point clouds in the laser point cloud used for constructing the reflectance map collected in the each collection region comprises:

calculating, based on a constraint condition corresponding to the regular frame laser point clouds other than the sample frame laser point clouds in the laser point cloud used for constructing the reflectance map that is collected in the collection region, an optimized position and Euler angle of a laser radar center corresponding to each of the regular frame laser point clouds collected in the collection region that satisfy a convergence condition corresponding to the regular frame laser point clouds, wherein the constraint condition corresponding to the regular frame laser point clouds comprises: the position and the Euler angle of the laser radar center corresponding to each of the regular frame laser point clouds, a weight corresponding to the position and the Euler angle of the laser radar center corresponding to the regular frame laser point clouds, and a transformation relationship between adjacent regular frame laser point clouds; and using the optimized position and Euler angle of the laser radar center corresponding to each of the regular frame laser point clouds collected in the collection region that satisfy the convergence condition corresponding to the regular frame laser point clouds as the position and the Euler angle, used for constructing the reflectance map, of the laser radar center corresponding to the each of the regular frame laser point clouds.

10. The method according to claim 9, wherein the convergence condition corresponding to the regular frame laser point clouds comprises: a sum of a pose differential corresponding to the regular frame laser point clouds and a transformation relationship differential corresponding to the regular frame laser point clouds is less than a threshold, the pose differential corresponding to the regular frame laser point clouds is a sum of differentials between the optimized position and Euler angle of the laser radar center corresponding to each of the regular frame laser point clouds and the position and the Euler angle of the laser radar center corresponding to the each of the regular frame laser point clouds, the transformation relationship differential corresponding to the regular frame laser point clouds is a sum of differentials between transformation relationships between adjacent regular frame laser point clouds after optimization and transformation relationships between adjacent regular frame laser point clouds before optimization, and the weight corresponding to the position and the Euler angle of the laser radar center corresponding to the regular frame laser point clouds is a weight of the pose differential corresponding to the regular frame laser point clouds.

11. An apparatus for constructing a reflectance map, comprising:

at least one processor; and a memory storing instructions, which when executed by the at least one processor, cause the at least one processor to perform operations, the operations comprising:

respectively selecting, from a laser point cloud collected in the each collection region in a region corresponding to a to-be-constructed reflectance map, a laser point cloud used for constructing a reflectance map, and respectively selecting sample frame laser point clouds from the laser point cloud used for constructing the reflectance map collected in each collection region;

respectively selecting a key frame laser point cloud from the sample frame laser point clouds collected in the each collection region, and respectively determining, based on an adjustment amount corresponding to the key frame laser point cloud collected in the each collection region, an optimal key frame laser point cloud collected in the each collection region, the adjustment amount being determined based on an amount of movement between a center position of a laser radar corresponding to the key frame laser point cloud after being merged with a second key frame laser point cloud and a center position of the laser radar corresponding to the key frame laser point cloud;

respectively performing a global pose optimization on a laser point cloud other than the key frame laser point cloud in the laser point cloud used for constructing the reflectance map collected in the each collection region, to obtain a position and an Euler angle, used for constructing the reflectance map, of a laser radar center corresponding to each frame laser point cloud used for constructing the reflectance map collected in the each collection region; and constructing the reflectance map based on the position and the Euler angle, used for constructing the reflectance map, of the laser radar center corresponding to the each frame laser point cloud used for constructing the reflectance map collected in the each collection region.

12. The apparatus according to claim 11, wherein the respectively selecting, from laser point clouds collected in each collection region in a region corresponding to a to-be-constructed reflectance map, laser point clouds used for constructing a reflectance map comprises:

removing a laser point cloud having a collection time with an erroneous timestamp, from the laser point cloud collected in the collection region;

removing a laser point cloud having an identical center position as the center position of the laser radar, from the laser point cloud collected in the collection region; and using the remaining laser point clouds in the laser point cloud collected in the collection region, as the laser point cloud used for constructing the reflectance map collected in the collection region.

13. The apparatus according to claim 12, wherein the respectively determining, based on an adjustment amount corresponding to the key frame laser point cloud collected in the each collection region, an optimal key frame laser point cloud collected in the each collection region comprises:

calculating an average adjustment amount of each key frame laser point cloud collected in the collection region, wherein the average adjustment amount is obtained by dividing a sum of the adjustment amounts corresponding to the key frame laser point cloud by a number of other key frame laser point clouds merged with the key frame laser point cloud;

determining a key frame laser point cloud corresponding to a greatest average adjustment amount, and calculating average adjustment amounts of remaining key frame laser point clouds other than the key frame laser point cloud corresponding to the greatest average adjustment amount; and using a key frame laser point cloud corresponding to a smallest average adjustment amount in the remaining key frame laser point clouds as the optimal key frame laser point cloud collected in the collection region.

14. The apparatus according to claim 13, wherein the respectively performing a global pose optimization on a laser point cloud other than the key frame laser point cloud in the laser point cloud used for constructing the reflectance map collected in the each collection region comprises:

using a position and an Euler angle of a laser radar center corresponding to the optimal key frame laser point cloud collected in the each collection region as a position and an Euler angle, used for constructing the reflectance map, of the laser radar center corresponding to the optimal key frame laser point cloud collected in the each collection region, and respectively performing the pose optimization on other key frame laser point clouds collected in the each collection region other than the optimal key frame laser point cloud, to obtain a position and an Euler angle, used for constructing the reflectance map, of a laser radar center corresponding to each of the other key frame laser point clouds collected in the each collection region;

respectively performing the pose optimization on other sample frame laser point clouds collected in the each collection region other than the key frame laser point cloud, to obtain a position and an Euler angle, used for constructing the reflectance map, of a laser radar center corresponding to each of the other sample frame laser point clouds collected in the each collection region; and respectively performing the pose optimization on regular frame laser point clouds other than the sample frame laser point clouds in the laser point cloud used for constructing the reflectance map collected in the each collection region, to obtain a position and an Euler angle, used for constructing the reflectance map, of a laser radar center corresponding to each of the regular frame laser point clouds collected in the each collection region.

15. A computer readable storage medium storing a computer program, the program, when run by a processor, causing the processor to perform operations, the operations comprising:

respectively selecting, from laser point clouds collected in each collection region in a region corresponding to a to-be-constructed reflectance map, laser point clouds used for constructing a reflectance map, and respectively selecting sample frame laser point clouds from the laser point cloud used for constructing the reflectance map collected in the each collection region;

respectively selecting a key frame laser point cloud from the sample frame laser point clouds collected in the each collection region, and respectively determining, based on an adjustment amount corresponding to the key frame laser point cloud collected in the each collection region, an optimal key frame laser point cloud collected in the each collection region, the adjustment amount being determined based on an amount of movement between a center position of a laser radar corresponding to the key frame laser point cloud after being merged with a second key frame laser point cloud and a center position of the laser radar corresponding to the key frame laser point cloud;

respectively performing a global pose optimization on a laser point cloud other than the key frame laser point cloud in the laser point cloud used for constructing the reflectance map collected in the each collection region, to obtain a position and an Euler angle, used for constructing the reflectance map, of a laser radar center corresponding to each frame laser point cloud used for constructing the reflectance map collected in the each collection region; and constructing the reflectance map based on the position and the Euler angle, used for constructing the reflectance map, of the laser radar center corresponding to the each frame laser point cloud used for constructing the reflectance map collected in the each collection region.

* * * * *